United States Patent [19]

Guthrie

[11] Patent Number: 5,297,999
[45] Date of Patent: Mar. 29, 1994

[54] CONTINUOUS DRIVE TRANSMISSION

[76] Inventor: Burton E. Guthrie, 9470 Huckleberry Rd., Berrien Center, Mich. 49102

[21] Appl. No.: 36,801

[22] Filed: Mar. 25, 1993

[51] Int. Cl.$^5$ .............................................. F16H 59/00
[52] U.S. Cl. ...................................................... 474/19
[58] Field of Search ................................... 474/19–21, 474/69–72

[56] References Cited

U.S. PATENT DOCUMENTS

| | | | |
|---|---|---|---|
| 3,590,649 | 7/1971 | Fischer | 474/19 |
| 4,378,221 | 3/1983 | Huff et al. | 474/19 |
| 4,869,705 | 9/1989 | Fenton | 474/21 X |
| 5,045,028 | 9/1991 | Rattunde et al. | 474/19 X |

Primary Examiner—Thuy M. Bui
Attorney, Agent, or Firm—Flynn, Thiel, Boutell & Tanis

[57] ABSTRACT

A transmission includes first and second members which are supported for independent rotation about an axis, and a drive arrangement which effects rotation of the first member about the axis in a rotational direction. A cam is provided on one of the first and second members, and a cam follower is provided on the other thereof, the cam follower being movable between positions disengaged from and engaged with the cam and the cam follower moving along the cam in response to rotation of the first member in the rotational direction relative to the second member when the cam follower is engaged with the cam. An arrangement is provided to resist movement of the cam follower along the cam beyond a predetermined position, and causes a force in the rotational direction to be transferred from the first member to the second member through the cam follower and cam when the cam follower is at the predetermined position on the cam, so that the second member is rotated in the rotational direction synchronously with the first member.

16 Claims, 1 Drawing Sheet

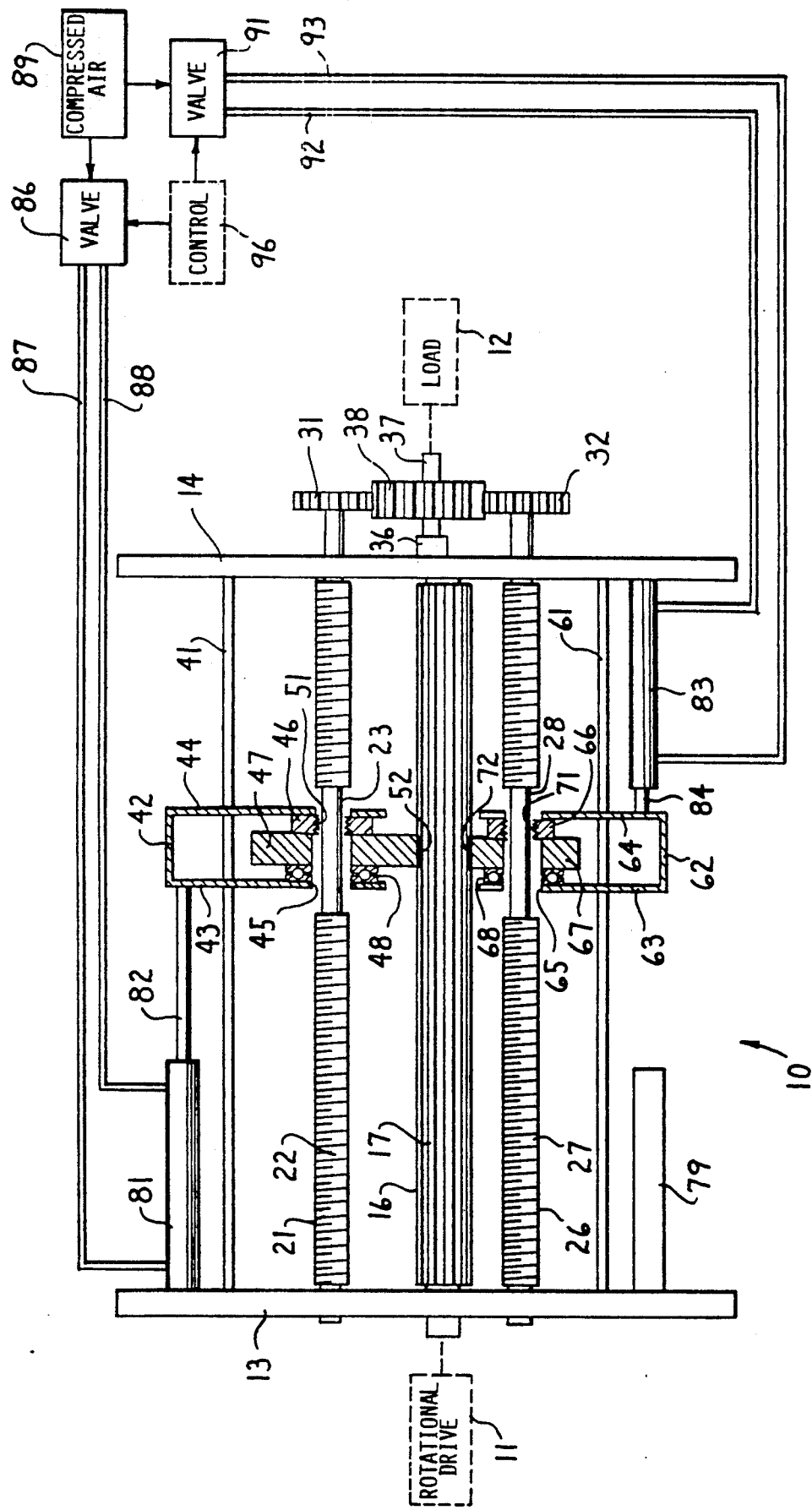

CONTINUOUS DRIVE TRANSMISSION

FIELD OF THE INVENTION

The present invention relates to a transmission and, more specifically, to a transmission which has two drive ratios and can supply a continuous driving force to a load while changing from one ratio to the other.

BACKGROUND OF THE INVENTION

Over the years, a variety of transmissions have been developed to transfer a driving force from a rotational drive arrangement to a rotationally driven load. While these pre-existing transmissions have been generally adequate for their intended purposes, they have not been satisfactory in all respects.

In many, the drive path from the driving device to the load is physically interrupted during a change from one ratio to another, which can waste energy both from the point of view of rotational energy output by the drive device during the interruption which is not applied to any load, as well as the energy expended to terminate the interruption, for example through heat generated and lost in a friction clutch used to effect and terminate the interruption in the drive path.

A further consideration is that the transition from one drive ratio to another is frequently not very smooth, and can involve inefficiency as a result of the fact that a continuous drive force is not applied to the load and/or a continuous resistance is not applied to the drive device during a transition from one ratio to another.

Some of these problems have been avoided by continuously variable transmissions, for example of the type in which two oppositely oriented conical members rotate about parallel axes, and a drive belt engages each and can move axially to vary the ratio. However, continuously variable transmissions of this type have not proven entirely satisfactory in practice, as evidenced by the fact that the majority of vehicles presently being sold do not include transmissions of this type.

It is therefore an object of the present invention to provide an improved transmission which avoids problems of the type discussed above, in particular by providing a continuous driving force to a load and a continuous resistance to a driving device while changing from one drive ratio to another drive ratio, and which is designed to experience minimal power loss during the transition from one such ratio to another.

SUMMARY OF THE INVENTION

The objects and purposes of the invention, including those set forth above, are met by providing an apparatus which includes first and second members supported for independent rotation about an axis, a drive arrangement for effecting rotation of the first member about the axis in a rotational direction, a cam provided on one of the first and second members, and a cam follower provided on the other thereof, the cam follower being movable between positions disengaged from and engaged with the cam, and the cam follower moving along the cam in response to rotation of the first member in the rotational direction relative to the second member when the cam follower is engaged with the cam. An arrangement is provided which resists movement of the cam follower along the cam beyond a predetermined position and causes a force in the rotational direction to be transferred from the first member to the second member through the cam follower and cam when the cam follower is at the predetermined position, so that the second member is rotated in the rotational direction synchronously with the first member.

BRIEF DESCRIPTION OF THE DRAWING

A preferred embodiment of the invention is disclosed in detail hereinafter with reference to the accompanying drawing, which is a diagrammatic top view of a two-ratio continuous drive transmission which embodies the present invention.

DETAILED DESCRIPTION

Referring to the drawing, reference numeral 10 designates a two-ratio continuous drive transmission which embodies the present invention, which is driven by a conventional rotational drive device 11 such as an electric motor or internal combustion engine, and which in turn rotationally drives a conventional load 12 such as an air compressor or the wheels of a vehicle.

The transmission 10 includes two spaced and vertically-extending stationary support plates 13 and 14. A splined shaft 16 has its opposite ends rotatably supported by conventional and not-illustrated bearings disposed in openings in the support plates 13 and 14. The shaft 16 has a plurality of circumferenially spaced and axially extending splines or teeth 17 which extend substantially the full length thereof.

A shaft 21 also has its ends supported by respective conventional and not-illustrated bearings in the support plates 13 and 14, and has a threaded portion 22 which is axially adjacent a non-threaded portion 23. The non-rotational threaded portion 23 is an approximately cylindrical surface having a radius substantially equal to the radius of the radially innermost portion of the groove between adjacent turns of the thread on portion 22. A similar shaft 26 also has its ends rotatably supported by not-illustrated bearings in the support plates 13 and 14, and has a threaded portion 27 which is axially adjacent a non-threaded portion 28.

The shafts 21 and 26 each have fixedly secured to the right end thereof a respective pinion 31 or 32. A support block 36 is fixedly secured to the outer side of the support plate 14, and has a conventional and not-illustrated bearing rotatably supporting an output gear 38 which is disposed between and meshes with each of the pinions 31 and 32.

A cylindrical rod 41 extends parallel to the shaft 21 and has its respective ends fixedly secured to the support plates 13 and 14. A U-shaped bracket 42 has spaced and parallel legs 43 and 44 with aligned openings through which the rod 41 slidably extends. The legs 43 and 44 also have aligned openings 45 through which the shaft 21 coaxially extends, the diameter of the openings 45 being slightly greater than the outside diameter of the threads 22 on shaft 21.

Coaxially encircling the shaft 21 between the legs 43 and 44 of bracket 42 are a nut 46 disposed adjacent the leg 44, a thrust bearing 48 disposed adjacent the leg 43, and a gear 47 disposed between the nut 46 and thrust bearing 48. The nut 46 is internally threaded, the teeth 51 thereof having radially innermost portions with a radius slightly greater than that of the non-threaded portion 23 of the shaft 21. The gear 47 and thrust bearing 48 each have therethrough a central opening with a diameter approximately equal to the diameter of the opening 45 in bracket leg 43. The gear 47 is welded to the nut 46, and to the adjacent race of the thrust bearing 48. The nut 46 and gear 47 can rotate about the shaft 21 relative to the shaft and bracket 42. The gear 47 has teeth 52 around its outer periphery, which mesh with the teeth 17 on the spline shaft 16.

In a similar manner, a further rod 61 extending parallel to the shaft 26 has its respective ends fixedly supported on the plates 13 and 14, and slidably supports a U-shaped bracket 62 having spaced legs 63 and 64. The legs 63 and 64 have aligned openings 65 which slidably receive the shaft 26, and provided between the legs 63 and 64 are a nut 66, gear 67 and thrust bearing 68, the nut having teeth 71 and the thrust bearing 68 having teeth 72.

In the preferred embodiment, the splined shaft 16 has thirteen teeth 17, the gear 47 has thirty teeth 52, the gear 67 has nineteen teeth 72, the pinion 31 has seventeen teeth, the pinion 32 has twenty-two teeth, and the output gear 38 has fifty-four teeth. However, it will be recognized that the specific number of teeth provided on the various gears and shafts can be varied without departing from the principle of the present invention.

A stop 79 is fixedly mounted on a side of a support plate 13 nearest the support plate 14, and is adjacent the rod 61. A first pneumatic cylinder has a housing 81 with one end fixedly mounted on the side of support plate 13 facing support place 14, and has a reciprocable piston rod 82 which extends parallel to and is adjacent the rod 41, and which has its outer end fixedly secured to the leg 43 of bracket 42. Similarly, a second pneumatic cylinder includes a housing 83 which is fixedly secured to the side of support plate 14 facing support plate 13, and has a reciprocable piston rod 84 which extends parallel to and is adjacent the rod 61, and which has its outer end fixedly secured to the leg 64 of bracket 62.

A first pneumatic valve 86 is coupled by respective conduits 87 and 88 to opposite ends of the pneumatic cylinder housing 81, and receives air from a compressed air source 89. A similar pneumatic valve 91 is coupled through respective conduits 92 and 93 to opposite ends of the pneumatic cylinder housing 83, and also receives air from a compressed air source 89. The valves 86 and 91 are each controlled by a mechanism 96, which may represent a manual control arrangement or an automated control arrangement. The valves 86 and 91 each have at least two operational modes, including a first mode in which compressed air is supplied to the corresponding conduit 87 or 92 in order to urge the associated piston rod 82 or 84 to move out of its housing 81 or 83, and a second mode in which compressed air is supplied to the corresponding conduit 88 or 93 in order to cause the associated piston rod 82 or 84 to be urged to withdraw into its housing 81 or 83. An optional third mode could also be provided, in which compressed air is not supplied to either of the conduits connected to the valve, so that the associated piston rod 82 or 84 is not urged to move in either direction.

OPERATION

The transmission 10 is shown in a neutral mode in FIG. 1, in which the brackets 42 and 62 are each positioned so that the associated nuts 46 and 66 are disposed in axial alignment with the non-threaded portions 23 and 28 of the shafts 21 and 26. The rotational drive arrangement 11 is thus rotating the splined shaft 16, which in turn is rotating the gears 47 and 67, but the gears 47 and 67 and the attached nuts 46 and 66 simply rotate about the shafts 21 and 26. The shafts 21 and 26 are not rotating at this point, and thus the pinions 31 and 32 and the output gear 38 are stationary and are not driving the load 12. In this mode, the valves 86 and 91 are each set so that the pneumatic cylinders 81 and 83 are urging their respective piston rods as far rightwardly as they will go, or are set so that no compressed air is supplied to either of the pneumatic cylinders 81 and 83 and thus the piston rods thereof are not urged to move in either direction.

To engage first drive ratio (the lowest ratio), the control arrangement 96 actuate the valve 86 so that it supplies compressed air through conduit 88 to the pneumatic cylinder 81, which urges the piston rod 82 leftwardly and causes it to slide bracket 42 leftwardly along rod 41 until the nut 46 is disposed against the right end of the threads 22 on the shaft 21. The direction of rotation of the gear 47 and nut 46 by the shaft 16 is such that the teeth 51 of nut 46 begin to rotate onto the threads 22 of the non-rotating shaft 21. The valve 86 is then reversed so that it is supplying compressed air to the conduit 87 rather than to the conduit 88, which tends to urge the piston rod 82 outwardly. However, since the threads of nut 46 are now engaged with the threads 22 on shaft 21, the nut 46 is prevented from moving rightwardly, and in fact will continue to move leftwardly as a result of continued rotation of the gear 47 with respect to stationary shaft 21 by splined shaft 16, the gear 47 and bracket 42 moving leftwardly with nut 46 against urging of the piston rod 82. At this point, the resistance of the load 12, which acts on the shaft 21 through the gears 31 and 38, is sufficient to resist rotation of the shaft 21. In a sense, the thread of portion 22 of the shaft 21 serves as a cam and the thread 51 of the nut 46 serves as a cam follower.

As the nut 46 continues to move the gear 47 and bracket 42 leftwardly, the pneumatic cylinder 81 provides a progressively increasing amount of resistance to leftward movement of piston rod 82. The axial thrust bearing 48 is provided to minimize friction between the gear 47 and the leg 43 of bracket 42 as the nut 46 moves gear 47 leftwardly while the pneumatic cylinder 81 simultaneously provides progressively increasing resistance to leftward movement of bracket leg 43.

Eventually, the resistance provided by the pneumatic cylinder 81 to leftward movement of the bracket 42 will exceed the rotational resistance of the load 12, which is resisting rotation of shaft 21. Consequently, the bracket 42 will stop moving leftwardly, which necessarily means that, as a result of the engagement of thread 51 on nut 46 with thread 22 of shaft 21, the rotating nut 46 will rotationally drive the shaft 21 at the same speed as the nut 46. Thus, the rotationally-driven splined shaft 16 will be rotating the gear 47, which through the attached nut 46 will be rotating the shaft 21 and its pinion 31 at the same speed as the gear 47, the pinion 31 in turn be rotating the output gear 38 which drives the load 12. At this point, the first ratio is fully engaged.

The second ratio is engaged in a similar manner. In particular, the valve 91 is actuated to supply compressed air to pneumatic cylinder 83 through conduit 92 so that piston rod 84 urges bracket 62 leftwardly, until the teeth 71 on nut 66 have rotated a small distance onto the threads 27 of shaft 26. The valve 91 is then reversed, so that compressed air is supplied through conduit 93 to the cylinder 83 to urge the piston rod 84 leftwardly. It will be noted that, at this time, the shaft 26 is rotating rather than stationary, due to the fact that its pinion 32 is engaged with the rotating output gear 38. However, the gear 67 is being rotated by the splined shaft 16 faster than the shaft 26 is being rotated, and so the nut 66 and bracket 62 will move leftwardly along the rotating shaft 26 in a manner similar to that already described above for nut 46, bracket 42, and shaft 21. In a sense, the thread of portion 27 serves as a cam and the thread of nut 66 serves as a cam follower.

Leftward movement of the bracket 62 could be terminated in a manner similar to that described above for the bracket 42, in particular when the progressively increasing resistance of pneumatic cylinder 83 to leftward movement of bracket 62 becomes sufficient to prevent further leftward movement. As an alternative, however, a fixed stop such as that shown at 79 can be provided, and a similar stop could also be provided to halt leftward movement of bracket 42.

When the bracket 62 engages the end of stop 79, the bracket 62 stops moving leftwardly. As a result, the shaft 26 is forced to rotate with the nut 66 at the speed at which the nut 66 and gear 67 are being rotated by splined shaft 16. This is a faster speed than that at which the shaft 26 was being rotated through pinion 32 by the output gear 38, and thus shaft 26 takes over the task of rotationally driving the load 12 through the pinion 32 and output gear 38.

It should be evident that, since the pinion 32 is now rotating the output gear 38 faster than it was being rotated by pinion 31, the output gear 38 will in turn be rotating pinion 31 and shaft 21 at a speed faster than that at which they were being rotated by gear 47 and nut 46. Of course, the splined shaft 16 forces the gear 47 and nut 46 to continue rotating at the same speed. Therefore, since the shaft 21 is now rotating faster than the nut 46, the nut 46 will begin moving rightwardly along the threaded portion of shaft 22, assisted by the fact that the piston rod 82 of pneumatic cylinder 81 is urging rightward movement of the bracket 42.

The bracket 42 will thus be moved rightwardly to the position shown in the figure, which in the preferred embodiment is the fully extended position of the piston rod 82. At this point, the gear 47 and nut 46 are still being rotated by the splined shaft 16, but are exerting no driving forces on the rotating shaft 21. The splined shaft 16 is, through gear 67, nut 66, shaft 26 and pinion 32, rotating the output gear 38 at a higher speed than it had been rotating, reflecting the fact that the second drive ratio controlled by the pneumatic cylinder 83 is a higher drive ratio than that controlled by pneumatic cylinder 81.

It is important to note that, during the transition from the first ratio to the second ratio, the load 12 is continuously subjected to a driving force from the rotational drive arrangement 11. There is no point in time during the ratio change at which the load 12 is operationally uncoupled from the rotational drive device 11. It should also be noted that, when the second drive ratio is engaged by the pneumatic cylinder 83, the first drive ratio which had been previously engaged by pneumatic cylinder 81 automatically disengages itself.

Although a particular preferred embodiment of the invention has been illustrated and described in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus, comprising: first and second members supported for independent rotation about an axis; drive means for effecting rotation of said first member about said axis in a rotational direction; a cam supported on one of said first and second members and a cam follower supported on the other thereof, said cam follower being movable between positions disengaged from and engaged with said cam and said cam follower moving along said cam in response to rotation of said first member in said rotational direction relative to said second member when said cam follower is engaged with said cam; and means for resisting movement of said cam follower along said cam beyond a predetermined position and for causing a force in said rotational direction to be transferred from said first member to said second member through said cam follower and said cam when said cam follower is at said predetermined position along said cam, so that said second member is rotated in said rotational direction synchronously with said first member.

2. An apparatus according to claim 1, wherein said means for resisting provides progressively increasing resistance to movement of said cam follower along said cam.

3. An apparatus according to claim 1, wherein said second member is a shaft having a threaded portion and a non-threaded portion, said threaded portion including a thread which is said cam, and wherein said first member is supported on said second member for rotational and axial movement with respect thereto and has internal threads which are engageable with said threaded portion of said second member and which serve as said cam follower, said means for resisting movement being cooperable with said first member for resisting axial movement of said first member relative to said second member when said thread of said first member are in engagement with said threaded portion of said second member.

4. An apparatus according to claim 3, wherein said drive means includes a rotationally driven splined shaft which extends approximately parallel to the shaft which is said second member, and wherein said first member includes a gear portion which meshingly engages said splined shaft.

5. An apparatus according to claim 4, including selectively actuable means for urging axial movement of said first member relative to said second member from a position in which said threads on said first member are aligned with said non-threaded portion of said second member to a position in which said threads on said first member are engaging said threaded portion of said second member.

6. An apparatus according to claim 5, wherein said selectively actuable means includes a pneumatic cylinder having a stationary housing and having a reciprocable piston rod, includes means operationally coupling said piston rod to said first member for effecting axial movement of said first member in response to movement of said piston rod, and includes means for selectively supplying air to said pneumatic cylinder in a manner causing said piston rod to urge axial movement of said first member relative to said second member in a direction from a first position thereof to a second position thereof.

7. An apparatus according to claim 6, wherein said means for resisting movement includes means for reversing the supply of compressed air to said pneumatic cylinder after said threads of said first member are engaging said threaded portion of said second member so that said piston rod is urging movement of said first member in a direction toward said first position thereof.

8. An apparatus according to claim 6, wherein said means for resisting movement includes a part coupled to said piston rod and includes a stationary stop disposed in a path of movement of said part, movement of said piston rod being halted in response to engagement of said part and said stationary stop.

9. An apparatus according to claim 1, including third and fourth members supported for independent rotation about a further axis, said drive means effecting rotation of said third member about said further axis in a further rotational direction, wherein a further cam is supported on one of said third and fourth members and a further cam follower is supported on the other thereof, said further cam follower being movable between positions disengaged from and engaged with said further cam, and said further cam follower moving along said further cam in response to rotation of said third member in said further rotational direction relative to said fourth member when said further cam is engaged with said further cam follower; and including means for resisting movement of said further cam follower along said further cam beyond a predetermined position and for causing a force in said further rotational direction to be transferred from said third member to said fourth member through said further cam and said further cam follower when said further cam follower is at said predetermined position along said further cam so that said fourth member is rotated in said further rotational direction synchronously with said third member, said second and fourth members being operatively coupled so that rotation of said fourth member in said further rotational direction by said third member effects rotation of said second member in said first-mentioned rotational direction faster than said first member, causing said first-mentioned cam follower to move along said first-mentioned cam from said predetermined position thereon to said position disengaged from said cam.

10. An apparatus according to claim 9, wherein said second and fourth members are parallel shafts which each have a threaded portion and a non-threaded portion, the threads of each threaded portion serving as a respective one of said cams, said first and third members each being rotatably supported and being axially movable along a respective one of said second and fourth members, and each having threads thereon which serve as a respective one of said cam followers.

11. An apparatus according to claim 10, including a rotatably supported output gear drivingly coupled to a load, and including two pinions which are each fixedly secured to a respective one of said shafts and which each meshingly engage said output gear.

12. An apparatus according to claim 11, wherein said drive means includes a rotationally driven splined shaft extending parallel to said shafts which are said second and fourth members, said first and third members each including a gear portion which meshingly engages said splined shaft and is axially moveable therealong.

13. An apparatus according to claim 12, including first selectively actuable means for urging axial movement of said first member relative to said second member from a position in which said threads on said first member are axially aligned with said non-threaded portion of said second member to a position in which said threads on said first member contact said threaded portion of said second member, and second selectively actuable means for urging axial movement of said third member relative to said fourth member from a position in which said threads on said third member are aligned with said non-threaded portion of said fourth member to a position in which said threads on said third member contact said threaded portion of said fourth member.

14. An apparatus according to claim 13, including first and second stationary rods which each extend parallel to said splined shaft and said shafts which are said second and fourth members, and including first and second brackets which are each slidably supported on a respective one of said rods and which each have a pair of legs spaced in a direction parallel to said rods, wherein said first member and a first axial thrust bearing are disposed between said legs of said first bracket with said first axial thrust bearing axially encircling the shaft which is said second member and engaging an axially facing surface on one side of said first member, and wherein said third member and a second axial thrust bearing are disposed between said legs of said second bracket, said second axial thrust bearing encircling the shaft which is said fourth member and being disposed against an axially facing surface on said third member.

15. An apparatus according to claim 14, wherein said first selectively actuable means includes a first pneumatic cylinder having a stationary housing and having a reciprocable piston rod which is coupled to said first bracket, and means for selectively supplying compressed air to said first pneumatic cylinder; and wherein said second selectively actuable means includes a second pneumatic cylinder with a stationary housing and a reciprocable piston rod which is coupled to said second bracket, and means for selectively supplying compressed air to said second pneumatic cylinder.

16. An apparatus according to claim 9, wherein said second and fourth members are each drivingly coupled to a rotatable output member, and wherein said output member is subjected to a continuous driving force from a point in time when said first-mentioned cam follower is at said predetermined position on said first-mentioned cam and said first member is driving said second member to a point in time when said further cam follower is at said predetermined position on said further cam, said third member is driving said fourth member, and said first-mentioned cam follower has become disengaged from said first-mentioned cam.

* * * * *